US012753789B2

(12) United States Patent
Kang et al.

(10) Patent No.: US 12,753,789 B2
(45) Date of Patent: Oct. 6, 2026

(54) ONE-WAY FASTENER

(71) Applicant: DAEWOO BOLT CO., LTD., Dangjin-si (KR)

(72) Inventors: Hee Joon Kang, Dangjin-si (KR); Ye Ri Kang, Dangjin-si (KR)

(73) Assignee: DAEWOO BOLT CO., LTD., Dangjin-si (KR)

(*) Notice: Subject to any disclaimer, the term of this patent is extended or adjusted under 35 U.S.C. 154(b) by 901 days.

(21) Appl. No.: 17/920,460

(22) PCT Filed: Dec. 20, 2021

(86) PCT No.: PCT/KR2021/019414
§ 371 (c)(1),
(2) Date: Sep. 6, 2023

(87) PCT Pub. No.: WO2022/139371
PCT Pub. Date: Jun. 30, 2022

(65) Prior Publication Data

US 2024/0052868 A1 Feb. 15, 2024

(30) Foreign Application Priority Data

Dec. 21, 2020 (KR) ........................ 10-2020-0180299

(51) Int. Cl.
*F16B 13/06* (2006.01)

(52) U.S. Cl.
CPC .................................. *F16B 13/061* (2013.01)

(58) Field of Classification Search
CPC ........ F16B 13/061; F16B 5/02; F16B 37/061; F16B 19/1072
USPC ...................................................... 411/34, 38
See application file for complete search history.

(56) References Cited

U.S. PATENT DOCUMENTS 2,324,142 A * 7/1943 Eklund .............. F16B 19/1072 470/2
4,048,898 A 9/1977 Salter
4,631,889 A 12/1986 Adam et al.
4,844,673 A 7/1989 Kendall
(Continued)

FOREIGN PATENT DOCUMENTS

CN 1126805 A 7/1996
CN 106795902 A 5/2017
(Continued)

OTHER PUBLICATIONS

Indian Office Action mailed on Nov. 3, 2025.

*Primary Examiner* — Kimberly T Wood
(74) *Attorney, Agent, or Firm* — You & IP, LLC

(57) ABSTRACT

Proposed is a one-way fastener configured to be inserted and coupled from an outside that is open toward a through-hole provided in a fixture to a closed inside, the one-way fastener includes a deformable sleeve and a pressurizing sleeve fitted to the fastener body, a pressurizing ring configured to be fitted over the fastener body that is exposed through the pressurizing sleeve, and a pressurizing member coupled by a screw-type engagement to the fastener body that is exposed through the pressurizing ring. Whereby, when any one surface among the respective side surfaces of the fixture is located in a closed space and thus a bolt and nut cannot be fastened, the one-way fastener can easily be fixed from the open surface of the fixture toward the closed space surface.

1 Claim, 7 Drawing Sheets

(56) References Cited

U.S. PATENT DOCUMENTS

| | | | | |
|---|---|---|---|---|
| 5,030,050 | A | 7/1991 | Auriol et al. | |
| 5,178,502 | A | 1/1993 | Sadri | |
| 5,603,592 | A * | 2/1997 | Sadri | F16B 19/1054 411/39 |
| 6,247,883 | B1 * | 6/2001 | Monserratt | F16B 13/045 411/69 |
| 11,821,448 | B2 * | 11/2023 | Takeda | F16B 5/02 |

FOREIGN PATENT DOCUMENTS

| | | | |
|---|---|---|---|
| DE | 2139869 | A1 | 2/1972 |
| JP | 03-004011 | A | 1/1991 |
| JP | 06313415 | A | * 11/1994 |
| JP | 08-0121443 | A | 5/1996 |
| JP | 10227308 | A | 8/1998 |
| JP | 2003-504571 | A | 2/2003 |
| JP | 3679442 | B2 | 8/2005 |
| JP | 2011-226625 | A | 11/2011 |
| JP | 2017-082844 | A | 5/2017 |
| JP | 6544641 | B2 | 7/2019 |
| JP | 2020-20372 | A | 2/2020 |
| KR | 100147848 | B1 | 8/1998 |
| KR | 1020020042801 | A | 6/2002 |
| KR | 10-2015-0114060 | A | 10/2015 |
| KR | 101743074 | B1 | 6/2017 |
| KR | 102266423 | B1 | 6/2021 |
| WO | 2020026941 | A1 | 2/2020 |

* cited by examiner

ONE-WAY FASTENER

CROSS-REFERENCE TO RELATED APPLICATIONS

This application is a U.S. National Phase Entry of International Application No. PCT/KR2021/019414 filed on Dec. 20, 2021, which claims the benefit of priority to Korean Patent Application No. 10-2020-0180299 filed on. Dec. 21, 2020, the entire content of which is incorporated herein by reference.

TECHNICAL FIELD

The present disclosure relates to a one-way fastener that can be easily fixed from an open surface of a fixture toward a closed space surface when any one surface among the respective side surfaces of a fixture is located in a closed space and thus a bolt and nut cannot be fastened.

BACKGROUND ART

In general, methods for coupling fixtures include welding, riveting, and bolting methods.

In case of welding, as a permanent joint method, one fixture and another fixture are melted by a high temperature and then joined together through a cooling process, whereas riveting and bolting are non-permanent joint methods. In case of riveting, a through-hole is provided in each fixture, and a rivet is inserted into through-holes and compressed by a press, plastically deforming a rivet end so that one fixture and the other fixture are non-detachable. In the case of bolting, the through-hole is provided in each fixture, and a bolt is inserted into through-holes and tightened with a nut so that one fixture and the other fixture are detachable.

Bolting is done by inserting a bolt body having a bolt head and an external screw thread into the fixture and the through-hole provided in the fixture so that the external screw thread is exposed, then the bolt head is hung on the through-hole, and the nut having an internal screw thread is inserted into the external screw thread. A coupled or fixed state is maintained through the process of combining and tightening the bolt and nut.

However, such bolting is possible only in a state in which both sides of each fixture are opened. In a state in which one side is closed, that is, when it is difficult for the operator's hand or tool to enter, there is a problem that an operation is impossible.

In an effort to solve this problem, Korean Patent No. 10-1743074 (Registration date: May 29, 2017) proposed a one-way bolt fastening structure. In the proposed bolt fastening structure, the workability of bolt fastening was improved by allowing a folding washer to unfold by its own force after passing through a fastening hole of a fastening member, wherein the folding washer is configured to be folded in half by an elastic thin plate attached to an inner folding surface among two surfaces, where each face of the fastening member comes into contact.

However, since an operator has to hold the folding washer in half with one hand so that a folded state is maintained and has to push an entry bar into a fastening hole of the fastening member with the other hand, entry work of the one-way bolt and washer and the fastening work of the nut cannot be linked. In addition, there was a problem in that a use of a power tool was not efficient.

Moreover, there was a problem in that when the nut is fastened, the one-way bolt idles along a rotation of the nut and is not completely fastened.

DISCLOSURE

Technical Problem

The one-way fastener of the present disclosure makes it easy for the operator to fasten the fastener using one hand and prevents the fastener from rotating along with a rotating direction of a pressurizing member by a spline shaft when fastening a pressurizing member. In addition, the one-way fastener of the present disclosure improves workability by preventing the spline shaft being separated from an end of the fastener body and protruding after fastening is completed.

Technical Solution

In the present disclosure, a one-way fastener A configured to be inserted and coupled from an outside that is open toward a through-hole H provided in a fixture F to a closed inside includes a deformable sleeve 20 and a pressurizing sleeve 30 fitted to the fastener body 10, a pressurizing ring 40 configured to be fitted over the fastener body 10 that is exposed through the pressurizing sleeve 30, and a pressurizing member 50 coupled by a screw-type engagement to the fastener body 10 that is exposed through the pressurizing ring 40.

In addition, the fastener body 10 includes a pressurizing head 120 provided at a rear portion of a fastener shaft 110, an external screw thread 130 having a predetermined length and being provided in front of the fastener shaft 110, and a spline shaft 140 configured to be cut along a perforated ring groove 141 when a torque of a certain limit or more is applied to an end of the external screw thread 130.

Moreover, the pressurizing head 120 of the fastener body 10 includes a pressurizing head ring 121 provided on an outer periphery of the fastener shaft 110 and configured in a "\" shape toward an outer periphery of the pressurizing head 120.

Furthermore, the deformable sleeve 20 includes an outer deformable guide groove 211 provided at a location spaced inwardly apart from each of opposite ends of the outer periphery of a cylindrical deformable sleeve body 210, by a predetermined distance, and an inner deformable guide groove 212 provided at a location spaced inwardly apart from opposite ends of the inner periphery of the deformable sleeve body 210 by a predetermined distance.

Still further, the inner deformable guide groove 212 of the deformable sleeve 20 is configured in a "⌒" shape.

The deformable sleeve 20 includes an insertion guide 220 having a shape that is expanded at one end of the inner periphery of the cylindrical deformable sleeve body 210.

The deformable sleeve 20 is configured to have a same diameter with that of the pressurizing sleeve 30 and have a lower strength than that of the pressurizing sleeve 30.

The pressurizing ring 40 has a same inner diameter with that of the pressurizing sleeve 30, and an outer diameter is larger than an edge of the pressurizing member 50.

The pressurizing member 50 is provided with an internal screw thread 501, having a predetermined length, which is configured to penetrate the pressurizing member 50, and a tool coupling part 502 having a polygonal shape on the outside.

The inner deformable guide groove 212 of the deformable sleeve 20 is configured in the "⌒" shape, and a bending guideline 213 is provided at the point where the inclination is changed.

In the best embodiment, a one-way fastener A configured to be inserted and coupled from an outside that is open toward a through-hole H provided in a fixture F to a closed inside includes a deformable sleeve 20 and a pressurizing sleeve 30 configured to be fitted to a fastener body 10, a pressurizing ring 40 configured to be fitted over the fastener body 10 that is exposed through the pressurizing sleeve 30, and a pressurizing member 50 coupled by a screw-type engagement to the fastener body 10 that is exposed through the pressurizing ring 40, wherein the fastener body 10 includes a pressurizing head 120 provided at a rear portion of a fastener shaft 110, and an external screw thread 130 having a predetermined length and being provided in front of the fastener shaft 110, wherein a pressurizing head ring 121 configured in a "⦣" shape toward an outer periphery of the pressurizing head 120 is provided on an outer periphery of the fastener shaft 110 of the pressurizing head 120 of the fastener body 10, a slit-shaped outer deformable guide groove 211 is provided at a location spaced inwardly apart from each of opposite ends of an outer periphery of a cylindrical deformable sleeve body 210 at the deformable sleeve 20 by a predetermined distance, and an inner deformable guide groove 212 configured in a equilateral "⌒" shape is provided at an inner periphery of the deformable sleeve body 210, wherein a thickness of the deformable sleeve 20 of the inner deformable guide groove 212 is gradually formed to be thinner up to a central bending line of the inner deformable guide groove 212, and on one side of the inner deformable guide groove 212, a one side bending guide line 213, where an inclination starts, is formed on an inner peripheral surface at a position of the outer deformation guide groove 211 formed at one side, while on an opposite side of the inner deformable guide groove 212, the opposite side bending guide line 213 having an inclination end is formed on the inner peripheral surface at a position spaced outward from the opposite outer deformable guide groove 211 by a predetermined distance.

Advantageous Effects

According to the present disclosure, after a fastener body having a deformable sleeve and a pressurizing sleeve is inserted through the through-hole provided in a fixture, in a process of coupling a pressurizing member by a screw-type engagement, expanding the deformable sleeve placed in a closed space thereby, there is an effect that of being easily fixed and coupled even in a surface at a closed space.

In addition, there is an effect that an operator can easily fasten a fastener using one hand.

Moreover, when fastening the pressurizing member, there is an effect of preventing the fastener body from rotating along with a rotation direction of the pressurizing member by a spline shaft.

Furthermore, by allowing the spline shaft to be cut and separated from an end of the fastener body after the fastener is fastened, it is possible to prevent a portion of the fastener body from being excessively exposed to outside of the pressurizing member.

An effect of improving workability can be obtained, thereby.

MODE FOR INVENTION

An embodiment of the present disclosure will be described below with reference to the accompanying drawings.

Figure 1:
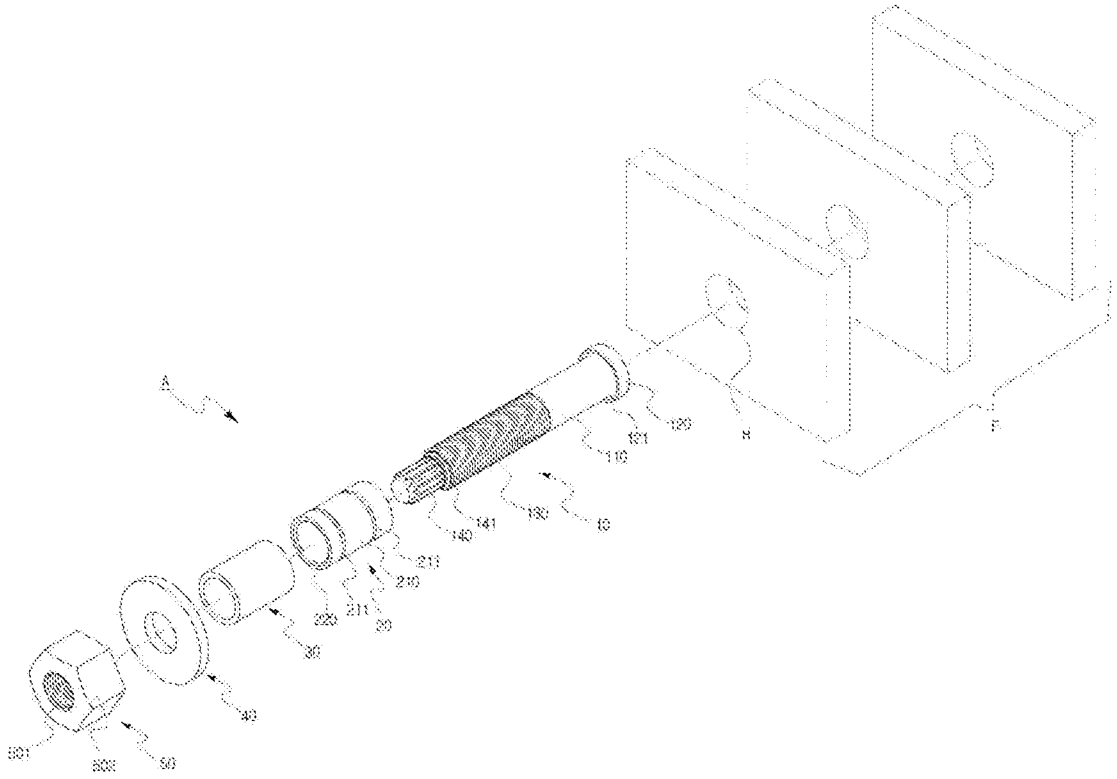
FIG. 1 is a perspective view illustrating a one-way fastener and a fixture separated from each other according to the present disclosure.
Figure 2:
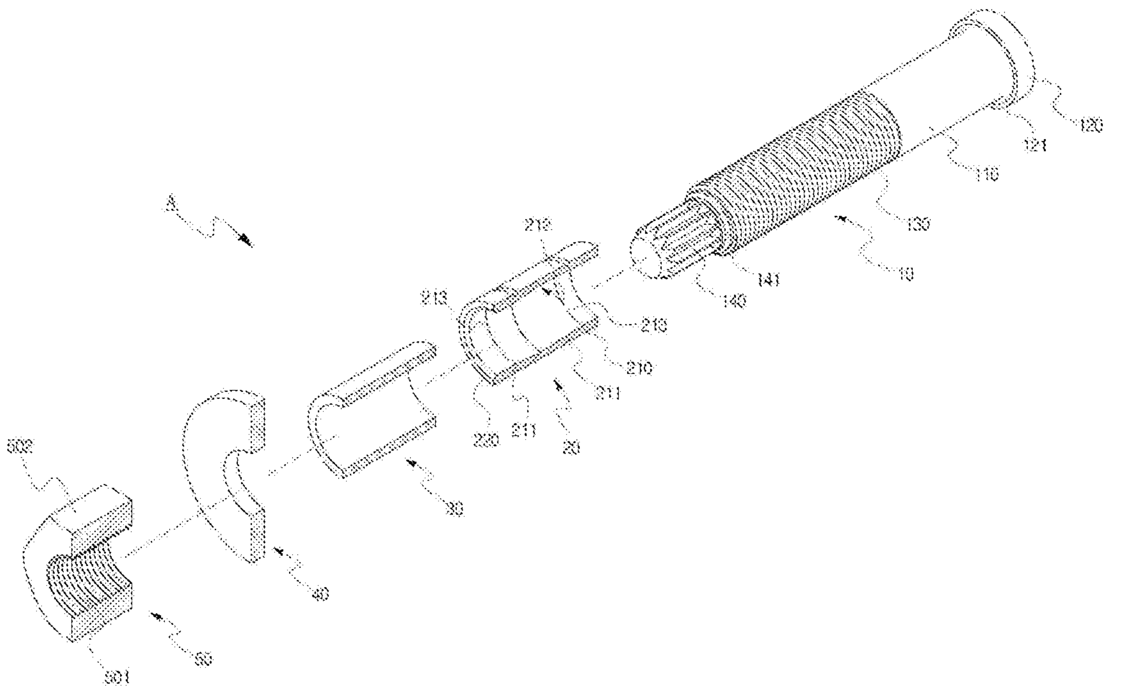
FIG. 2 is a perspective view illustrating a separate view of an inside and outside of the one-way fastener according to the present disclosure.
Figure 3:
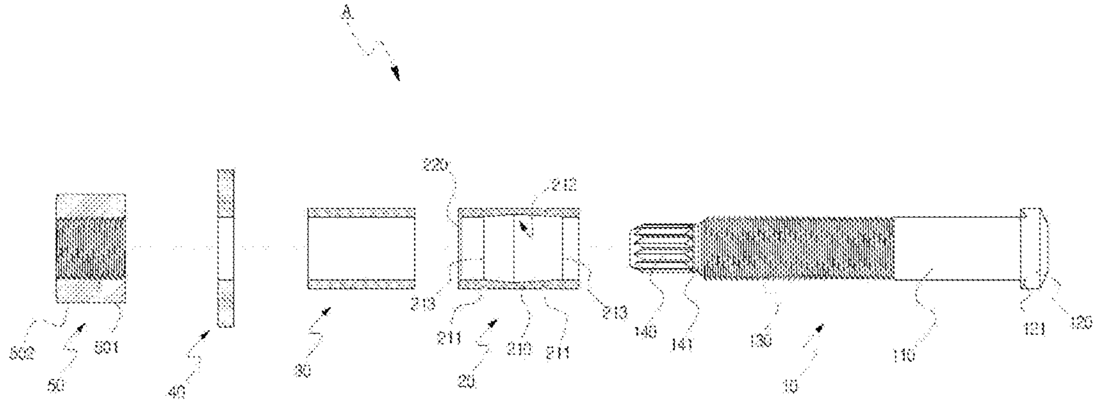
FIG. 3 is a longitudinal cross-sectional view illustrating an isolated one-way fastener according to the present disclosure.
Figure 4:
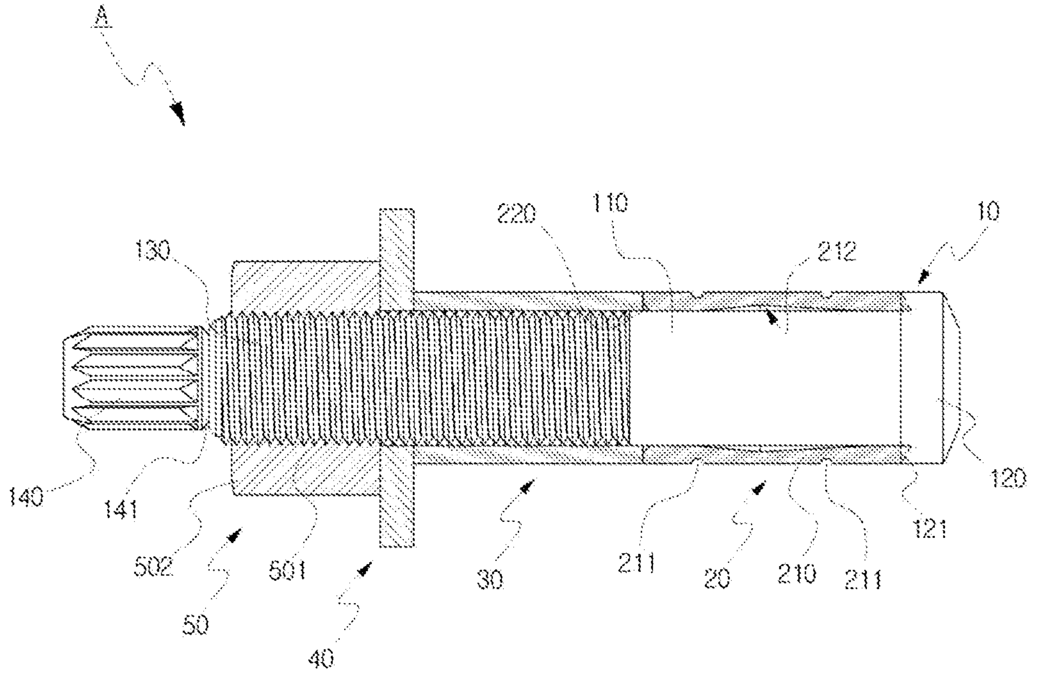
FIG. 4 is a longitudinal cross-sectional view illustrating the one-way fastener according to the present disclosure.

FIG. 1 is a perspective view illustrating a one-way fastener and a fixture separated from each other according to the present disclosure, FIG. 2 is a perspective view illustrating a separate view of an inside and outside of the one-way fastener according to the present disclosure, FIG. 3 is a longitudinal cross-sectional view illustrating an isolated one-way fastener according to the present disclosure, FIG. 4 is a longitudinal cross-sectional view illustrating the one-way fastener according to the present disclosure, FIGS. 5A to 5D are longitudinal cross-sectional views illustrating a process in which the one-way fastener is coupled to the fixture according to the present disclosure.

A one-way fastener A of the present disclosure is configured to prevent a portion of the fastener from protruding to outside while facilitating fastening by an operator using one hand to a fixture F having a closed space surface, as illustrated in FIGS. 1 to 4, and is configured to be inserted and coupled from outside that is open toward a through-hole H provided in the fixture F to a closed inside.

Such fastener A includes a fastener body 10, a deformable sleeve 20, a pressurizing sleeve 30, a pressurizing ring 40 and a pressurizing member 50. The deformable sleeve 20 and a pressurizing sleeve 30 are sequentially fitted to the fastener body 10. The pressurizing ring 40 is configured to be fitted over the fastener body 10 that is exposed through the pressurizing sleeve 30, and the pressurizing member 50 is coupled by a screw-type engagement to the fastener body 10 that is exposed through the pressurizing ring 40.

Here, the cylindrical fastener body 10 is made of a steel material of a predetermined length, and is provided with a pressurizing head 120 having a larger diameter than that of a fastener shaft 110 at a rear portion of the fastener shaft 110, an external screw thread 130 having a predetermined length in front of the fastener shaft 110, and a spline shaft having a perforated ring groove 141 at the end of the external screw thread 130 to have a protruding shape. When a torque of a certain limit or more by an air tool (not shown in the figure) is applied to an end of the external screw thread 130, the spline shaft 140 is configured to be cut along the perforated ring groove 141.

Such spline shaft 140 may prevent rotation along the rotating pressurizing member 50 as a state of being inserted into a head of the air tool (not shown in the figure) during operation.

The pressurizing head 120 is positioned in the closed space and is pulled by fastening or pulling force of the pressurizing member 50. By such pressure, the deformable sleeve 20 is configured to expand in a direction perpendicular to an axial direction of the fastener shaft 110 and compressed in the axial direction, simultaneously. At here, as a pressurizing head ring 121 provided on an outer periphery of the fastener shaft 110 and configured in a "\" shape toward an outer periphery of the pressurizing head 120, an inner periphery of the end-side of the middle deformable sleeve 20 which prevents the end of the deformable sleeve 20 facing the pressurizing head 120 from expanding outward, can be pressed against the outer periphery of the fastener shaft 110. That is, when a strong pressure is applied, it is possible to prevent the end of the pressurizing head 120 from being inserted into the inner periphery of the deformable sleeve 20 that is deformed.

The cylindrical deformable sleeve 20 is made of steel material so that when a strong pressure in the axial direction is applied, a middle portion is expanded in a form of a disk (ring) toward the outside so that the same function as the rivet can be provided. An outer deformable guide groove 211 is provided at a location spaced inwardly apart from each of opposite ends of the outer periphery of a cylindrical deformable sleeve body 210 by a predetermined distance so that a deformation in expanding around the outer deformable guide groove 211 is available. As an axial load intensively acts on the outer deformation guide groove 211, other parts are prevented from being deformed in advance.

In addition, as an inner deformable guide groove 212 is provided at a location spaced inwardly apart from opposite ends of the inner periphery of the deformable sleeve body 210 by a predetermined distance, an overlapping disk or ring shape is formed by the inner deformable guide groove 212. At here, as the inner deformable guide groove 212 is configured in a "⌒" shape, through a bent portion of an upper portion having a small cross-sectional area, bending or outward extending is generated in a same direction.

As an insertion guide 220 having a shape that is expanded at one end of the inner periphery of the cylindrical deformable sleeve body 210, such deformable sleeve 20 may prevent interference in a process of being couple to the sleeve shaft 110. At the moment, preferably, the deformable sleeve 20 is configured to have a same diameter with that of the pressurizing sleeve 30 and have a lower strength than that of the pressurizing sleeve 30 so that an elastic deformation can be easily made.

The pressurizing ring 40 does not allow a pressing force of the pressurizing member 50 to directly act on the pressurizing sleeve. Rather, the pressurizing ring 40 provides a complex function of allowing the pressing force of the pressurizing member 50 to act on the pressurizing ring 40 to prevent damage due to friction on the surface of the fixture F during the fastening process, firstly, increasing the cross-sectional area so that the sufficient pressing force can be applied, and preventing the pressurizing member 50 from being loosened in the reverse direction after being fastened.

As the pressurizing ring 40 is configured to have a same inner diameter with that of the pressurizing sleeve 30, and to have an outer diameter larger than an edge of the pressurizing member 50, the pressing force of the pressurizing member 50 may be transmitted in the axial direction.

The pressurizing member 50 is such that the deformable sleeve 20 can be deformed by the pressing force generated by pulling the fastener shaft 110 of the fastener body 10 in the axial direction, and is provided with an internal screw thread 501, having a predetermined length, to pass through, and is provided with a tool coupling part 502 having a polygonal shape on the outside.

On the other hand, the inner deformable guide groove 212 provided on the inner periphery of the deformable sleeve 20 is configured to have the simple "⌒" shape so as to be deformed into a "∩" shape by the load applied in the axial direction. However, the inner deformable guide groove 212 provided on the inner periphery of the deformable sleeve 20 is preferably provided with a bending guideline 213 to opposite ends at the point where the inclination is changed in addition to the shape, and in this case, it is more preferable that elastic deformation of bending is initially started at a certain position by the bending guideline 213, and deformation having complete "∩" shape can be made while the started elastic deformation is gradually increased.

This is because the pressing force by the uniform deformation of the deformable sleeve 20 is transmitted from the pressurizing member 50 through the fastener shaft 110 of the fastener body 10 and is applied equally on the deformable sleeve 20. Thereby, a uniform tightening force or coupling force is maintained as a whole, so that the coupled or fixed state is stably maintained.

FIGS. 5A to 5D are longitudinal cross-sectional views illustrating a process in which the one-way fastener is coupled to the fixture according to the present disclosure.

Figure 5A:
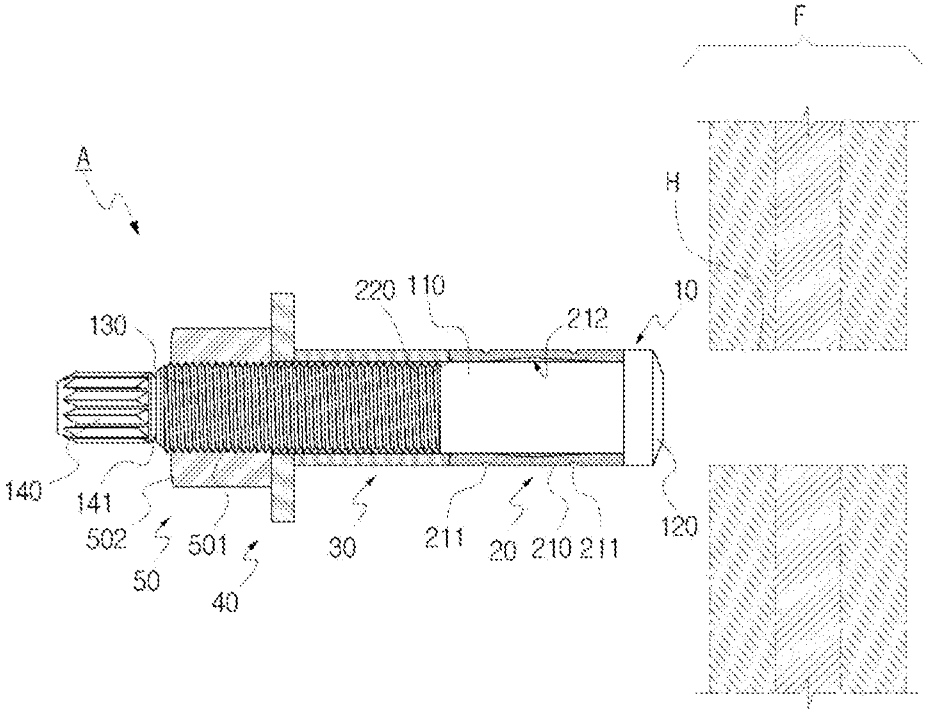
FIGS. 5A to 5D are longitudinal cross-sectional views illustrating a process in which the one-way fastener is coupled to the fixture according to the present disclosure.

First, as illustrated in FIG. 5A, in a process of coupling three separate fixtures F with through-holes H in a center into one, one side of the fixture F is opened space, and the other side of the fixture is closed space where workers' hands and tools cannot enter.

In the one-way fastener A of the present disclosure, the deformable sleeve 20 and the pressurizing sleeve 30 are fitted to the fastener shaft 110 of the fastener body 10, and then the internal screw thread 501 of the pressurizing member 50 is coupled to the external screw thread 130 in a state in which the pressurizing ring 40 is fitted.

Figure 5B:
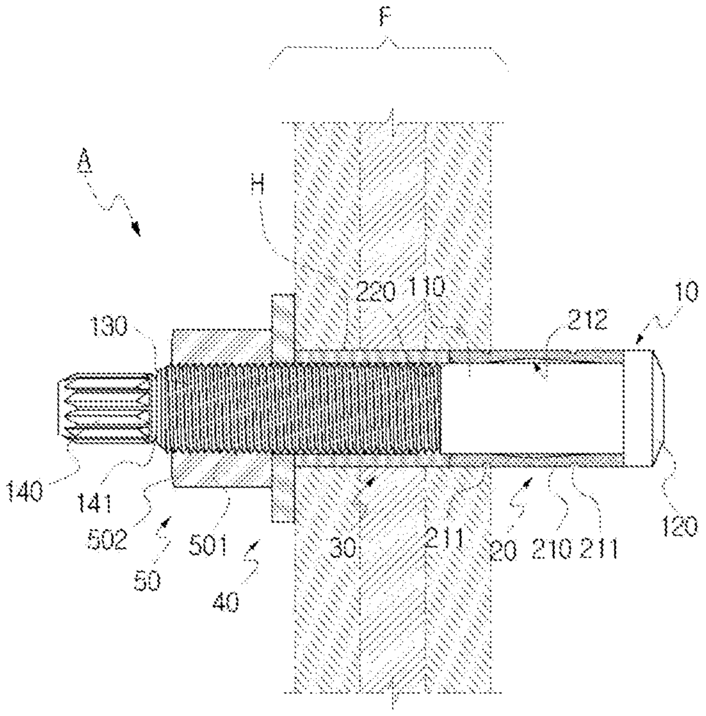

Next, as illustrated in FIG. 5B, in the process of inserting the pressurizing head 120 of the fastener body 10 through the through-hole H, the other side of the pressing ring 40 is inserted until it touches the surface of the fixture F.

Then, in the process of rotating the pressurizing member 50 using the air tool (not shown in the figure), the head of the air tool is coupled to the spline shaft 140, and only the pressurizing member 50 is rotated while preventing the fastener body 10 from rotating.

Figure 5C:
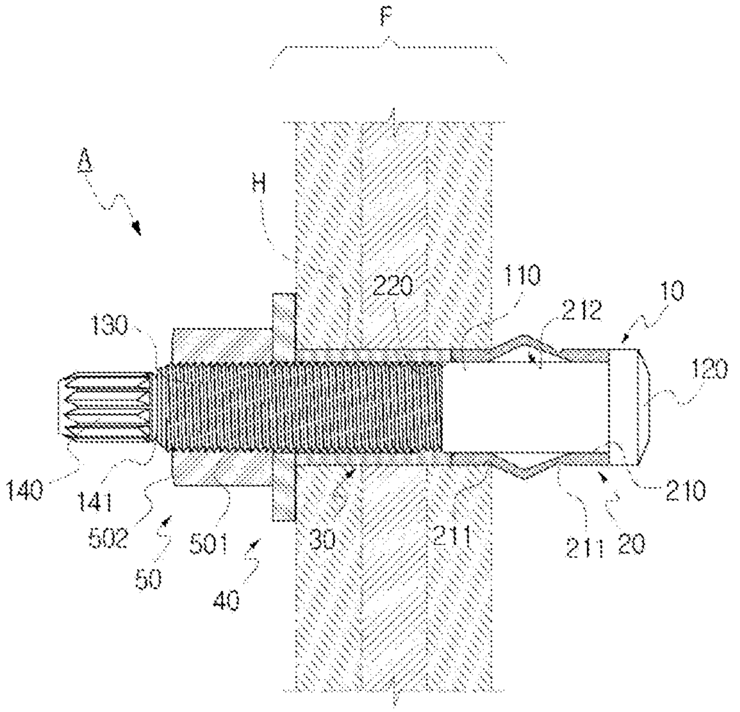

Thereafter, as illustrated in FIG. 5C. while the pressurizing member 50 is rotating, when the external screw thread 130 is move from right to left and the pressurizing head ring 121 of the pressurizing head 120 compresses the other end of the deformable sleeve 20 in one direction, the outer deformable guide groove 211 and the inner deformable guide groove 212 of the deformable sleeve body 210 expand outwardly while length is shortened in the axial direction.

Figure 5D:
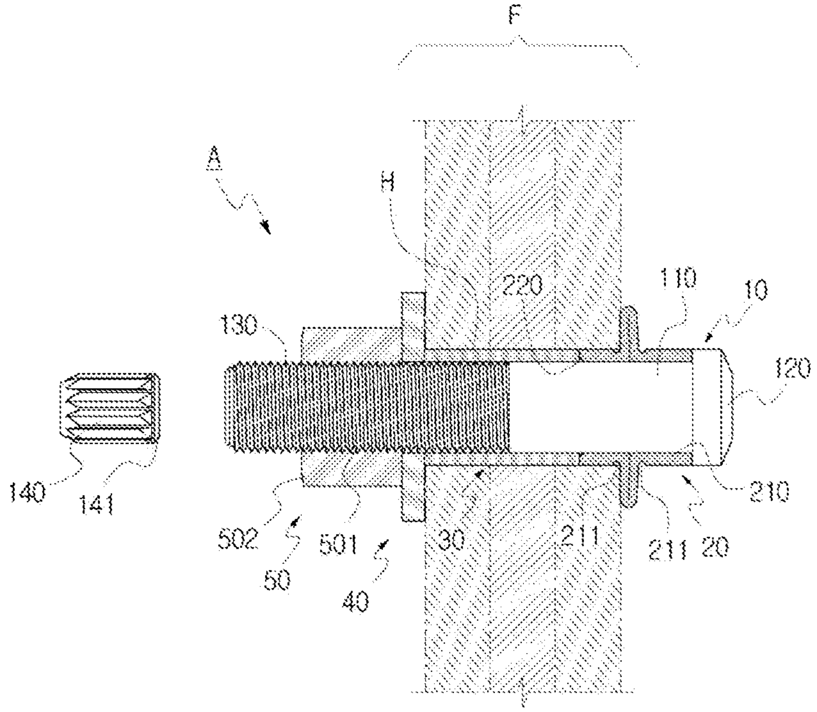

Next, as illustrated in FIG. 5D, with continuing rotation of the pressurizing member 50, the external screw thread 130 is pulled in the axial direction, and by the pressurizing head 120, the deformable sleeve 20 is coupled in the complete "∩" shape in a same time. Thereafter, when the torque of a certain limit or more by an air tool (not shown in the figure) is applied to the end of the external screw thread 130, the spline shaft 140 is configured to be cut along the perforated ring groove 141.

DESCRIPTION OF THE REFERENCE CHARACTERS IN THE DRAWINGS

10: fastener body, 20: deformable sleeve
30: pressurizing sleeve, 40: pressurizing ring
50: pressurizing member, 110: fastener shaft
120: pressurizing head, 121: pressurizing head ring
130: external screw thread, 140: spline shaft

141: perforated ring groove, 210: deformable sleeve

211: outer deformable guide groove, 212: inner deformable guide groove.

The invention claimed is:

1. An one-way fastener configured to be inserted and coupled from an outside that is open toward a through-hole (H) provided in a fixture (F) to a closed inside, the one-way fastener comprises:

a deformable sleeve (20) and a pressurizing sleeve (30) configured to be fitted to a fastener body (10);

a pressurizing ring (40) configured to be fitted over the fastener body (10) that is exposed through the pressurizing sleeve (30); and a pressurizing member (50) coupled by a screw-type engagement to the fastener body (10) that is exposed through the pressurizing ring (40), wherein the fastener body (10) comprises:

a pressurizing head (120) provided at a rear portion of a fastener shaft (110); and an external screw thread (130) having a predetermined length and being provided in front of the fastener shaft (110), wherein a pressurizing head ring (121) configured in a "\" shape toward an outer periphery of the pressurizing head (120) is provided on an outer periphery of the fastener shaft (110) of the pressurizing head (120) of the fastener body (10);

a slit-shaped outer deformable guide groove (211) is provided at a location spaced inwardly apart from each of opposite ends of an outer periphery of a cylindrical deformable sleeve body (210) at the deformable sleeve (20) by a predetermined distance; and an inner deformable guide groove (212) configured in an inequilateral "⌒" shape is provided at an inner periphery of the deformable sleeve body (210), wherein a thickness of the deformable sleeve (20) of the inner deformable guide groove (212) is gradually formed to be thinner up to a central bending line of the inner deformable guide groove (212), and on one side of the inner deformable guide groove (212), a one side bending guide line (213) is formed on an inner peripheral surface at a position of the outer deformation guide groove (211) formed at one side, while on an opposite side of the inner deformable guide groove (212), the opposite side bending guide line (213) is formed on the inner peripheral surface at a position spaced outward from the opposite outer deformable guide groove (211) by a predetermined distance.

* * * * *